United States Patent
Hadaschik et al.

(10) Patent No.: US 10,188,903 B2
(45) Date of Patent: Jan. 29, 2019

(54) DETERMINING A SPEED OF A MULTIDIMENSIONAL MOTION IN A GLOBAL COORDINATE SYSTEM

(71) Applicant: FRAUNHOFER-GESELLSCHAFT ZUR FOERDERUNG DER ANGEWANDTEN FORSCHUNG E.V., Munich (DE)

(72) Inventors: Niels Hadaschik, Nuremberg (DE);
Ferdinand Kemeth, Hausen (DE);
Matthias Schaefer, Nuremberg (DE);
Thomas Von Der Gruen, Kleinsendelbach (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 449 days.

(21) Appl. No.: 14/760,419

(22) PCT Filed: Jan. 18, 2013

(86) PCT No.: PCT/EP2013/050965
§ 371 (c)(1),
(2) Date: Jul. 10, 2015

(87) PCT Pub. No.: WO2014/111159
PCT Pub. Date: Jul. 24, 2014

(65) Prior Publication Data
US 2015/0360080 A1    Dec. 17, 2015

(51) Int. Cl.
*G01P 7/00* (2006.01)
*A63B 24/00* (2006.01)
(Continued)

(52) U.S. Cl.
CPC ............ *A63B 24/0006* (2013.01); *G01B 5/00* (2013.01); *G01B 7/004* (2013.01); *G01B 11/00* (2013.01);
(Continued)

(58) Field of Classification Search
CPC .............. A63B 24/006; A63B 2220/40; A63B 2220/50; A63B 2220/51; A63B 2220/53;
(Continued)

(56) References Cited

U.S. PATENT DOCUMENTS

| | | | |
|---|---|---|---|
| 4,763,284 A | 8/1988 | Carlin | |
| 5,723,786 A * | 3/1998 | Klapman | G01P 15/18 |
| | | | 482/84 |

(Continued)

FOREIGN PATENT DOCUMENTS

| | | |
|---|---|---|
| EA | 011541 | 4/2009 |
| RU | 2257846 C1 | 8/2005 |

(Continued)

OTHER PUBLICATIONS

Huiyu Zhou et al., "Applications of wearable inertial sensors in estimation of upper limb movements", Science Direct, Biomedical Signal Processing and Control 1, 2006, Elsevier Ltd., pp. 22-32.

(Continued)

*Primary Examiner* — Kretelia Graham
(74) *Attorney, Agent, or Firm* — Harness, Dickey & Pierce, P.L.C.

(57) ABSTRACT

Embodiments relate to determining a speed of a multidimensional motion of an athlete in a global coordinate system based on multidimensional acceleration data from a multidimensional accelerometer placed at a movable limb of the athlete, the movable limb being at least one of translatory and rotatable, and the movable limb defining a local coordinate system. Based on the multidimensional acceleration
(Continued)

data, at least one correction quantity may be determined taking into account a rotation of the local coordinate system relative to the global coordinate system during the multidimensional motion. The speed of the multidimensional motion may be determined based on an integration of the multidimensional acceleration data and in consideration of the at least one correction quantity.

20 Claims, 10 Drawing Sheets

(51) Int. Cl.
  G01P 15/18 (2013.01)
  G06Q 10/06 (2012.01)
  G06K 9/00 (2006.01)
  G01B 5/00 (2006.01)
  G01B 7/004 (2006.01)
  G01B 11/00 (2006.01)
  G01P 15/00 (2006.01)
(52) U.S. Cl.
  CPC ............... *G01P 7/00* (2013.01); *G01P 15/00* (2013.01); *G01P 15/18* (2013.01); *G06K 9/00342* (2013.01); *G06Q 10/0639* (2013.01)
(58) Field of Classification Search
  CPC ....... A63B 2220/30; G01B 7/004; G01P 7/00; G01P 15/00; G01P 15/003; G01P 15/18; G01P 1/127; G06K 1/05; G06K 9/00342; G06K 9/00355
  See application file for complete search history.

(56) References Cited

U.S. PATENT DOCUMENTS

| 6,139,432 | A | 10/2000 | Watanabe et al. |
| 6,183,965 | B1 | 2/2001 | Verdine et al. |
| 2003/0024314 | A1 | 2/2003 | Akieda et al. |
| 2003/0163287 | A1* | 8/2003 | Vock .................... A43B 3/0005 702/187 |
| 2005/0080566 | A1 | 4/2005 | Vock et al. |
| 2006/0047447 | A1* | 3/2006 | Brady ................ A63B 71/0605 702/41 |
| 2006/0052983 | A1 | 3/2006 | Vock et al. |
| 2006/0179915 | A1 | 8/2006 | Bang et al. |
| 2007/0111753 | A1 | 5/2007 | Vock et al. |
| 2007/0208542 | A1 | 9/2007 | Vock et al. |
| 2009/0212941 | A1 | 8/2009 | Vock et al. |
| 2010/0076692 | A1 | 3/2010 | Vock et al. |
| 2010/0144414 | A1* | 6/2010 | Edis ................... A63B 24/0006 463/8 |
| 2012/0143514 | A1 | 6/2012 | Vock et al. |
| 2012/0150483 | A1 | 6/2012 | Vock et al. |
| 2012/0265477 | A1 | 10/2012 | Vock et al. |
| 2013/0151699 | A1 | 6/2013 | Vock et al. |
| 2013/0274904 | A1* | 10/2013 | Coza ...................... G06F 3/011 700/91 |

FOREIGN PATENT DOCUMENTS

| RU | 51475 U1 | 2/2006 |
| RU | 2322279 C1 | 4/2008 |

OTHER PUBLICATIONS

International Search Report PCT/ISA/210 for International Application No. PCT/EP2013/050965 dated Sep. 3, 2013.
Written Opinion of the International Searching Authority PCT/ISA/237 for International Application No. PCT/EP2013/050965 dated Sep. 3, 2013.
Russian Office Action dated Jan. 20, 2017 in Russian Application No. 2015121335/28(033210).

* cited by examiner

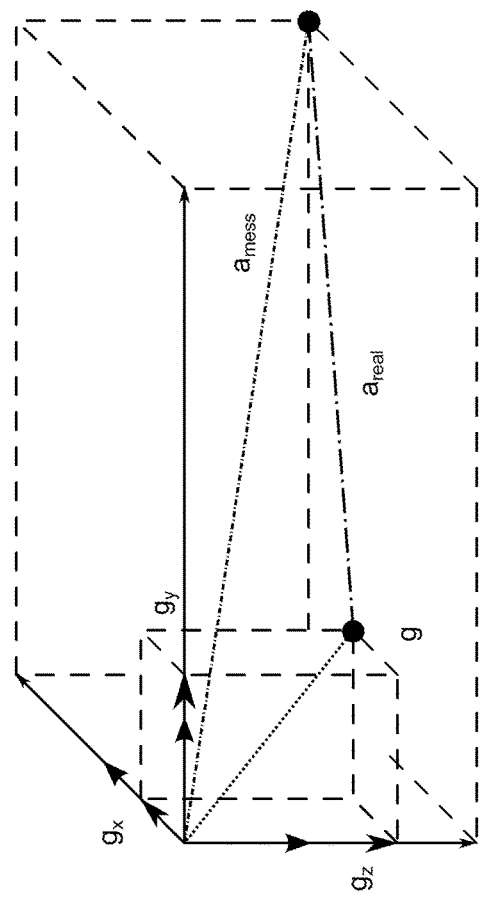
Fig. 1
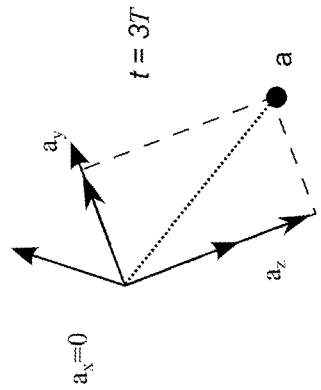
Fig. 2
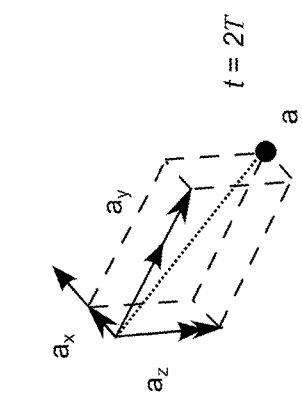
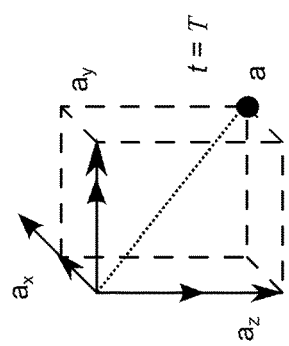

DETERMINING A SPEED OF A MULTIDIMENSIONAL MOTION IN A GLOBAL COORDINATE SYSTEM

CROSS-REFERENCE TO RELATED APPLICATION(S)

This application is the National Phase under 35 U.S.C. § 371 of PCT International Application No. PCT/EP2013/050965, which has an international filing date of Jan. 18, 2013, the entire contents of which is incorporated herein by reference.

Embodiments of the present invention relate to determining a speed of a multidimensional object motion in a global coordinate system and, more particularly, to determining the speed of a multidimensional motion of a punch, e.g. during a boxing match.

BACKGROUND

In some events, such as sport events like boxing matches, for example, it is desirable to provide a spectator with an enhanced experience of the event by means of information which he is able to understand and also compare. In the context of boxing fights there are concepts known in the art that shall provide information on the speed of boxing punches. Such information may then be used to enhance media (television) coverage of boxing matches.

For example, U.S. Pat. No. 6,139,432A or U.S. Pat. No. 6,183,965B describe a measurement of speed data based on video capture. For that approach, a boxer's first or boxing glove has to be continuously visible on the video image. Also, perspective movements distort correct speed estimation. Further, the image of the first or boxing glove should preferably have a good resolution, leading to complex camera and movement compensation techniques. Consequently, such video based systems do not seem to be well suited for speed estimation in (live) sport events, particularly boxing events.

US2010144414A discloses a computer-implemented method for analyzing activity of an athlete, e.g. a boxer, to permit qualitative assessments of that activity using a processor. The method comprises receiving activity-related data related to a punch event from sensors on the athlete. The sensors may be a three-axis accelerometer and a gyroscope coupled to the athlete. A database stores the activity-related data. The processor compares the received activity-related data against a set of pre-identified discrete outcomes, such as predefined motion profiles. The processor may identify one of the pre-identified outcomes as corresponding to the received activity-related data based on the comparison of the received activity-related data against the set of pre-identified outcomes. That is to say, the motion rules can be compared to the punch event data to determine what type of punch occurred. Finally, the identified pre-identified outcome may be displayed. Gyroscopes, however, are rather shock sensitive which may cause practical problems when using the concept of US2010144414A.

U.S. Pat. No. 4,763,284A sets forth a system for displaying the magnitude of forces produced by a sport participant in a sporting event such as boxing, martial arts, track events, swimming events, and the like. The system includes a first portable housing for placement on a limb, such as an arm or a leg of the participant or in the participant's equipment such as the shoulder pads of a football player. The housing is oriented in close proximity to the extremity of the limb so that it is near the forces produced by that limb. A sensor is located in the housing for detecting the magnitude and relative time of each force produced by the limb. The sensor is firmly oriented on the limb in close proximity to an internal bone structure in order to maximize the detection of the forces. The output of the sensor is a signal proportional to the magnitude of the force produced.

U.S. Pat. No. 5,723,786A describes a boxing glove comprising a boxing glove body and an accelerometer disposed within the boxing glove body which continuously measures an instantaneous acceleration of the boxing glove. The boxing glove may further comprise a radio frequency transmitter disposed in the body and coupled to the accelerometer for transmitting encoded accelerometer readings to a display. Also, the accelerometer may comprise three mutually orthogonal accelerometers.

A further possibility for tracking motions of an athlete, such as a boxer, would be to use Real-Time Locating Systems (RTLS). Such RTLS systems provide wireless tracking technology that may locate people and objects in real time and with high precision. Compared to video-based approaches, this radio-based technology offers some advantages. Its tracking capability is not diminished by obstacles obscuring the line of sight. The real-time tracking system is more responsive, accurate and flexible than any comparable technology. Hence, a boxer's glove could be equipped with transmitters or transponders. Signal propagation delays, signal propagation delay differences, angles of incidence, etc., a speed of a punch event and/or related acceleration data may be estimated.

However, based on the mentioned prior art it is desirable to provide either improved and/or simpler concepts for determining or estimating a speed of a multidimensional object or athlete motion.

SUMMARY

It is one finding of the present invention to use the measurement of acceleration data as a means of speed measurement. Acceleration data can be used to calculate speed by means of integration. Speed data as well as acceleration data may be determined as directional vectors having x-, y, and z-components. Thereby, x-, y-, and z-acceleration samples may be provided from a multidimensional accelerometer placed at a translatory and/or rotatably (or rotationally) movable object, such as an athlete's hand or a boxer's fist, for example. Thereby, the movable object defines a local, rotatable or rotating coordinate system within a fixed global coordinate system, in which the speed shall be determined or estimated.

According to a first aspect it is provided a method for determining a speed of a multidimensional object motion in a global coordinate system based on multidimensional acceleration data from a multidimensional accelerometer placed at a translatory and/or rotationally movable object, the movable object defining a local coordinate system. The method comprises determining, based on the multidimensional acceleration data, at least one correction quantity taking into account a rotation of the object's local coordinate system relative to the global coordinate system during the multidimensional object motion. Further, the method comprises determining the speed of the multidimensional object motion based on an integration of the multidimensional acceleration data in consideration of the at least one correction quantity.

According to a further aspect, embodiments provide an apparatus for determining a speed of a multidimensional object motion in a global coordinate system based on multidimensional acceleration data from a multidimensional accelerometer placed at a translatory and/or rotatably movable object, the movable object defining a local coordinate system. The apparatus comprises a processor operable to determine, based on the multidimensional acceleration data, at least one correction quantity taking into account a rotation of the object's local coordinate system relative to the global coordinate system during the multidimensional object motion, and a processor operable to determine the speed of the multidimensional object motion based on an integration of the multidimensional acceleration data in consideration of the at least one correction quantity.

Embodiments comprise determining the at least one correction quantity and/or the speed either centrally or locally at the movable object. In the first alternative (central processing), the processor operable to determine the at least one correction quantity and/or the processor operable to determine the speed may be a central or remote entity receiving the multidimensional acceleration data from the movable object either by wire or wireless, e.g. via radio signals. In the second alternative (local processing), the processor operable to determine the at least one correction quantity and/or the processor operable to determine the speed may be located directly at or in the movable object. Then the determined speed data may be further conveyed by wire or wireless transmission technologies.

In some embodiments the translatory and/or rotatably (or rotationally) movable object may be a limb of an athlete. More particularly, the translatory and/or rotatably movable object may be a first or a boxing glove around a first of a boxer. That is to say, the object may be a boxer wearing at least one boxing glove, wherein the multidimensional object motion is a multidimensional punch of the boxer, and wherein the multidimensional accelerometer, such as a three-axis accelerometer, may be placed at the at least one boxing glove.

Some embodiments comprise a digital control circuit installed within the apparatus for performing the method. Such a digital control circuit, e.g. a digital signal processor (DSP), an Application Specific Integrated Circuit (ASIC), or a general purpose computer, needs to be programmed accordingly. Hence, yet further embodiments also provide a computer program having a program code for performing embodiments of the method, when the computer program is executed on a computer or a digital processor.

BRIEF DESCRIPTION OF THE FIGURES

Some embodiments of apparatuses and/or methods will be described in the following by way of example only, and with reference to the accompanying figures, in which FIG. 1 illustrates vectors of overall acceleration and acceleration due to gravity;

FIG. 2 illustrates the same global acceleration vector in different local coordinate systems;

DESCRIPTION OF EMBODIMENTS

Figure 3A:
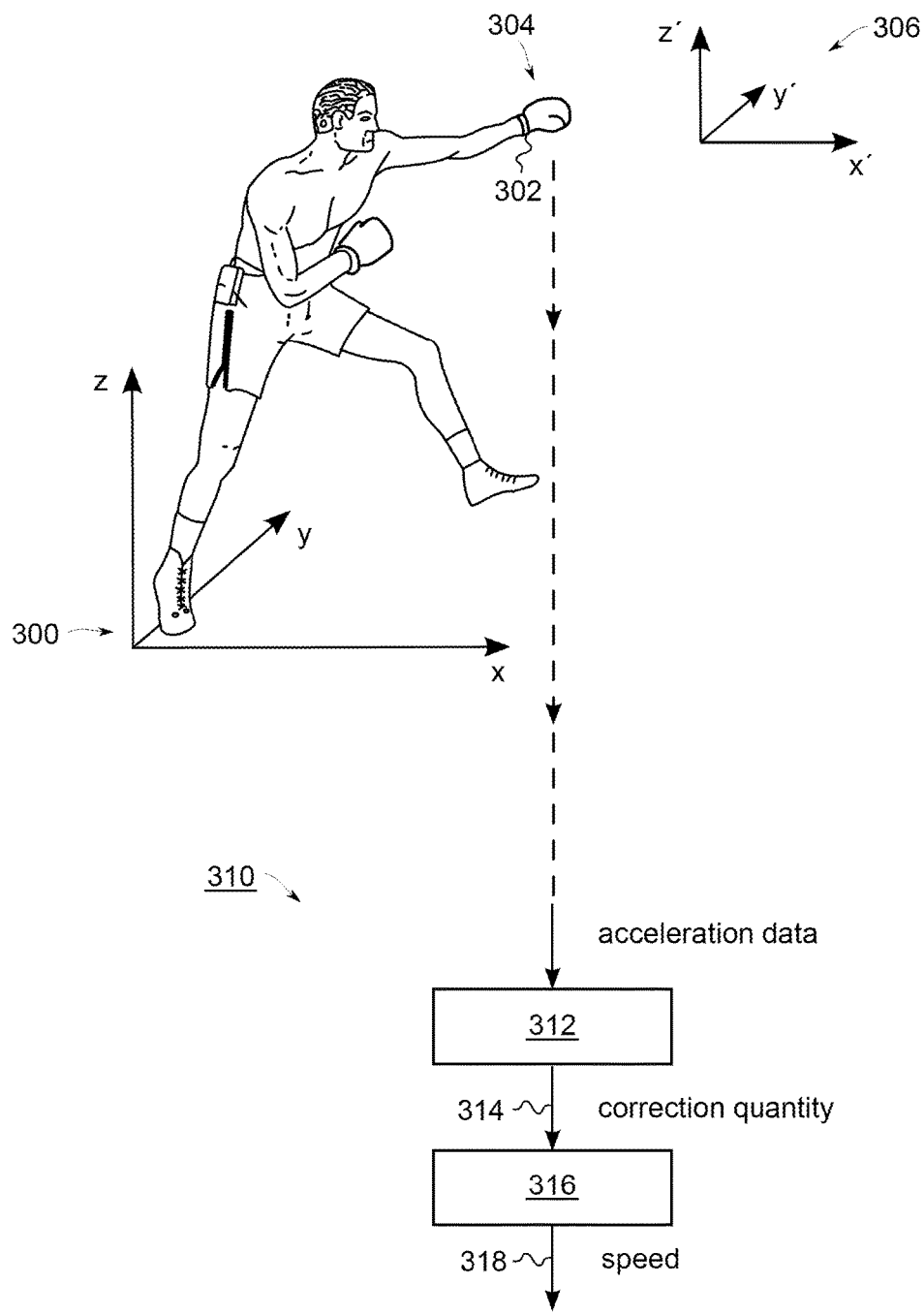
FIG. 3a schematically shows a flow chart of a method according to an embodiment.

In the following description of some exemplary embodiments the following mathematical notation will be used: vectors and matrixes are represented by lower-case and uppercase letters printed in bold. Vectors are defined as column vectors. $E\{X\}$ is the expected value and $\sigma_x^2$ is the variance of x. I denotes the unit matrix.

The problem of determining the speed of a translatory and/or rotatably movable object, e.g. in form of a punching fist, can be described fully only in three-dimensional space. To this end, an appropriate coordinate system may be defined with x, y and z directions—in this case, speed and acceleration thus need to be handled vectorial, i.e. in a manner split into a respective component in precisely these directions $v(t)=(v_x(t), v_y(t), v_z(t))^T$ (speed) and $a(t)=(a_x(t), a_y(t), a_z(t))^T$ (acceleration) ($X^T$ and $x^T$ represent the transposes of a matrix X and of a vector x, respectively). This coordinate system may be local, that is to say for the first or for the fighter in a defined initial orientation and position, or else global (in the sense of this problem wording) in a fixed coordinate system in the boxing ring, in the boxing hall, etc.

At any one time, the vectors (regardless of whether acceleration a(t) or speed v(t)) in these coordinate systems differ only by an appropriate coordinate rotation, which is given by an absolute-value-maintaining transformation, which can be expressed as multiplication by a (time-variant) transformation matrix S(t). For the transformation from the time-variant (rotating) local coordinate system to the static global coordinate system, this may be as follows, for the example of accelerations:

$$a_{global}(t)=S(t) \cdot a_{local}(t) \quad (1)$$

The decision about the choice of coordinate system then may be made pragmatically on the basis of the system prerequisites. In the situation with the multidimensional acceleration sensors integrated and fixed in the boxing gloves, the measurement data may stem from the local coordinate system of the first (or of the boxing glove). This coordinate system alters its orientation in comparison with the global coordinate system continuously. However, the isolated acceleration sensors alone cannot recognize the respective orientation or the alteration therein.

A continuous-time speed vector v may now be calculated mathematically at the time $t_1$ on the assumption of zero speed (standstill) at time $t_0$ from the acceleration vector a on the basis of $$v(t_1) = \int_{t_0}^{t_1} a(t)dt = \left( \int_{t_0}^{t_1} a_x(t)dt, \int_{t_0}^{t_1} a_y(t)dt, \int_{t_0}^{t_1} a_z(t)dt \right)^T \quad (2)$$

The individual components of a(t) may thus be integrated independently of one another, i.e. on a component-by-component basis for the vector. The zero time $t_0$ may be used for calibration to zero speed $v(t_0)=v_0=0$, because this initial speed is otherwise included additively in the above integration (formally, precisely this constant summand is absent in Eq. (2)). However, this equation is formally valid only for the global coordinate system or for a non-rotating, local coordinate system of the boxing glove.

In the step relating to periodic, discrete measurements, we may change to discrete times $t_n=t_0+nT$ for equidistant sampling in the range T, which means that summation produces discrete time accelerations.

$$v_n = v(t_n) \quad (3)$$

$$= \sum_{v=n_0}^{n} a_v \cdot T$$

$$= T \cdot \left( \sum_{v=n_0}^{n} a_{v\alpha}, \sum_{\mu=n_0}^{n} a_{\mu x}, \sum_{\kappa=n_0}^{n} a_{\kappa x} \right)^T$$

However, the measured acceleration values $\hat{a}_n$ at discrete time instant n deviate from the real acceleration by a time-variant noise term $\zeta_n$, about which there is initially no further statistical information available. Therefore, the following may initially assumed to be true:

$$\hat{a}_n = a_n + z_n. \quad (4)$$

This therefore has an additive effect on the speed estimate in the integral (in the sum) too, in the same way as any constant deviation over time (Bias) $b_0$ which may be present from absent or later erroneous calibration $$\hat{v}_n = v_n + b_0 + \zeta_n \quad (5)$$

$$= v_n + b_0 + T \cdot \sum_{v=n_0}^{n} z_v$$

Formally, the bias $b_0$ can also be included in the summed noise term $\zeta_n$, e.g. as a mean value, but the latter presupposes that $\zeta_n$ and also the individual terms $\zeta_n$ are free of mean values beforehand, and the step for the $z_n$ would result in this mean value being time-variant. Furthermore, in signal processing, it is frequently considered to be easier to write and handle a term which is constant over time separately in order to estimate it in easily visible form, e.g. by means of mean value formation, and then compensate for it.

As depicted in FIG. 1, the measured acceleration $a_{mess}$ in the earth's gravitational field is made up of two parts besides noise: firstly, a component which actually stems from (real) acceleration $a_{real,n}$ and secondly a component which works against acceleration due to gravity g. This applies with the exception of the free fall—but also proportionally in the limited fall. However, these cases are not relevant in the context of athletes, e.g. boxers, who are generally standing on the ground. Thus, by inserting $a_n=a_{real,n}-g_n$, the extension of Eq. (4)

$$\hat{a}_a = a_{real,n} + g_n + \zeta_n \quad (6)$$

is obtained, where $a_{real,n}$ describes the real acceleration at time n. Within the framework under consideration, the acceleration due to gravity $g_n$ has a constant absolute value on account of the possible position of the sensor in the boxing ring, which is severely restricted in terms of space.

$$|g_n| = g \approx 9.81 \frac{m}{s^2} \text{ in Central Europe} \quad (7)$$

However, this does not apply to the vector on account of the variable orientation of the first or the sensor in relation to the gravitational field, which means that in this case the following is generally true $$g_n \neq g_m \text{ für } m \neq n \quad (8)$$

i.e., the gravitation is distributed differently over the direction components in the course of time.

Estimating speed from these fundamental considerations by integrating the acceleration measurement results has serious restrictions or limitations of the speed estimation, which are discussed below functionally at first and then from the point of view of temporal/technical design.

The requirements discussed here are derived from the physical/mathematical and technical measurement principle in which the accelerations are measured in order to determine the speed.

However, the rotation of the multidimensional acceleration sensors (sensor axes) placed at a boxing glove, for example, generally also results in errors in the case of simple calculation of the speed by integrating over the acceleration vector. The following example is intended to clarify this: in this regard, we assume uniform acceleration ($a_n=a$ for n=1, 2, 3 and =0 otherwise) of an object from standstill in the global reference system for the next three time steps n=1, 2 and 3. The following is then subsequently certain to apply for the resulting global speed:

$$v_{global,3} = 3aT. \quad (9)$$

Owing to the rotation of the sensor and hence the local coordinate system during the acceleration, the inequality $$\sqrt{(a_{x1}+a_{x2}+a_{x3})^2 + (a_{y1}+a_{y2}+a_{y3})^2 + (a_{z1}+a_{z2}+a_{z3})^2} \, T \leq \quad (10)$$

$$3|a|T = 3aT$$

applies for acceleration in the three time steps that is constant in terms of absolute value and has the same global orientation, however, as shown in FIG. 2. The inequality is particularly clear when (unlike in FIG. 2) it is assumed in this example that for each time the acceleration moves completely in the direction of a (different) local axis, e.g. $|a|=a_{x1}=a_{y2}=a_{z3}$—all other acceleration components in Eq. (10) must therefore be 0. For this example, there is a resulting total speed of $\hat{v}_{local,3}=\sqrt{3}|a|T$. Hence, it is also clear that the speed calculated in this simple manner in the local coordinate system is incorrect because the transformation to a rotated coordinate system is a transformation which maintains absolute values, i.e. it redistributes the absolute value of the vector only differently over the components. The inequality (10) is just a specialization of triangle inequality or Cauchy-Schwarz inequality. For this reason too, it is clear that the above inequality must also apply for the general case with longer observation intervals.

The inequality of the summation can also be shown in a similar manner for globally variable acceleration. This thought experiment can also be turned round equally well, i.e. the same direction of acceleration in the rotating local system and hence different directions in the global system and hence $|\hat{v}_{local,3}|=3|a|T \geq |\hat{v}_{global,3}|$. It therefore follows that the speed locally estimated in this manner may also be faster than the real or global speed. Since no noisy measurement is being considered here, the roof over the symbol $v_{global}$ can be omitted. This symbolizes an estimate, with the real speed and the speed estimated in the global system without noise matching in this case. For embodiments, which involve integration over acceleration, the meaning of this is twofold:

The summation in a local coordinate or reference system is formally incorrect in the general case of possible rotation of the (local) sensor axes in the global coordinate system, The orientation of the local coordinate system may be determined in each case in order to calculate the acceleration correctly. The transformation to the global coordinate system is not necessary for this, however; it is sufficient to determine and correct the relative rotation in respect of the original orientation—or any other—during the integration, A compensation based on a type of the punch may also suffice for improving the result.

Some exemplary embodiments of the present invention will now be outlined briefly. It will be clear to the skilled persons that the principles of the present invention are not limited to the described exemplary embodiments. Instead, there may be structural alterations also solving the technical objectives underlying embodiments of the present invention. For example, although various embodiments will be described with respect to certain methods and steps thereof, it will be appreciated that apparatuses and systems comprising functional blocks for performing said methods and steps are also incorporated by embodiments of the present invention.

FIG. 3a schematically illustrates a flow chart of method 310 for determining a speed of a multidimensional object motion in a global coordinate system 300 based on multidimensional acceleration data from a multidimensional accelerometer 302 placed at a translatory and/or rotatably movable object 304. The movable object 304 defines a local coordinate system 306. In the exemplary embodiment of FIG. 3 the movable object 304 is a boxer or, more particularly, his first coved by a boxing glove. Consequently, the multidimensional object motion may be regarded as the motion of the boxer's first 304 due to a boxing punch in this embodiment. However, the skilled person will understand that alternate embodiments for other scenarios and movable objects may also be covered by the principles of the present invention.

Method 310 comprises a first step 312 of determining, based on the multidimensional acceleration data measured by the multidimensional accelerometer 302, at least one correction quantity 314 taking into account a rotation of the object's local coordinate system 306 relative to the global coordinate system 300 during the multidimensional object motion. Further, method 310 comprises a step 316 of determining the speed 318 of the multidimensional object motion based on an integration of the multidimensional acceleration data and in consideration of the at least one correction quantity 314. The skilled person will understand that the steps 312 and 316 may be implemented by accordingly adapted processors. Hence, the reference numerals 312 and 316 may also relate to a processing unit operable to determine, based on the multidimensional acceleration data, at least one correction quantity 314 taking into account a rotation of the object's local coordinate system 306 relative to the global coordinate system 300 during the multidimensional object motion, and a processing unit operable to determine the speed 318 of the multidimensional object motion based on an integration of the multidimensional acceleration data and in consideration of the at least one correction quantity 314.

Preferably, the at least one correction quantity 314 shall not be based on gyroscope data according to embodiments, as gyroscopes are considered to be rather shock sensitive. However, the use of a gyroscope shall also not be excluded from embodiments of the present invention.

In a first embodiment a result for the motion, e.g. a punch, or its speed may be based on motion pattern matching, wherein a set of predefined motion patterns may be stored in a central or local database, for example. The at least one correction quantity 314, which may be a scalar correction or compensation factor in this embodiment, is the smaller the more a punch movement resembles a circular path and the smaller the smaller the corresponding punch radius is. For such embodiments based on pattern matching, a learning phase may be foreseen, which may have to be performed for each athlete and/or punch type individually. During this learning phase a boxer may execute a particular punch under laboratory conditions. Thereby the characteristic punch motion may be recorded in parallel by an Inertial Navigation System (INS) system according to an embodiment and a more exact reference system, e.g. a video based motion capture system or a wireless radio-based Real-Time Locating System (RTLS). Both systems, i.e. the INS and the reference system, may individually determine the punch's speed $v_{INS}$ and $v_{ref}$, wherein the INS system uses the multidimensional acceleration data from the multidimensional accelerometer 302 (preferably without any corrections) and wherein the reference system may determine the speed based on the captured video images of the punch, for example. Based on a comparison of both individually determined speeds, a speed correction quantity 314 for a certain punch type may be determined, e.g., $k_{corr}=v_{ref}/v_{INS}$, which may then be used during a real fight or training scenario for correction of the speed values $v_{INS}$ determined based on the integration of the multidimensional acceleration data from the multidimensional accelerometer 302 according to $\hat{v}=k_{corr}*v_{INS}$.

Figure 3B:
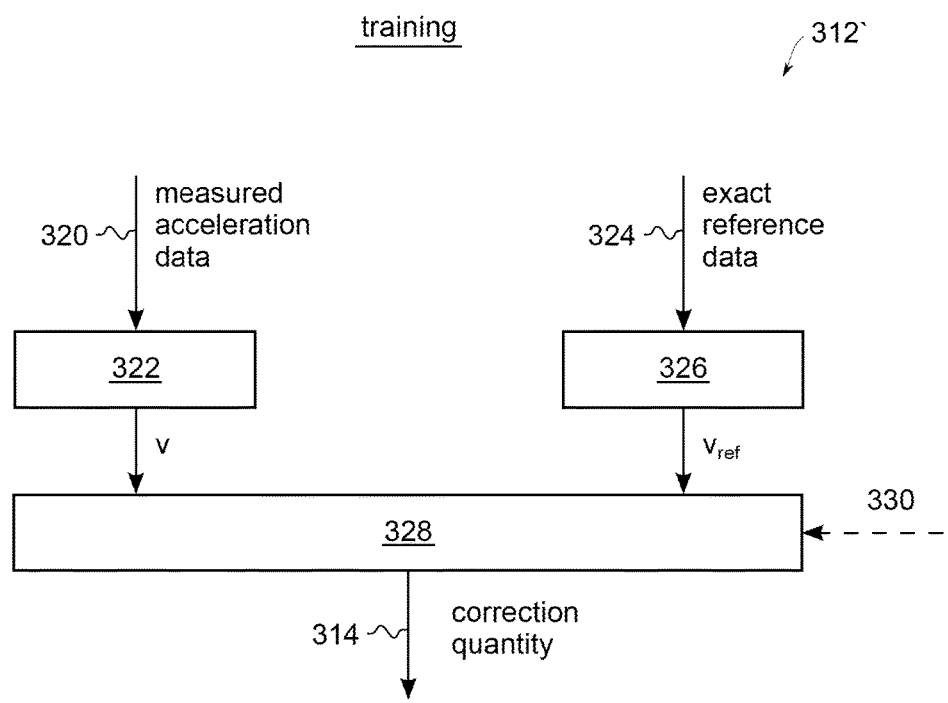
FIG. 3b schematically shows a training phase for a method according to an embodiment.

That is to say, step 314 of determining the at least one correction quantity 314 may comprise comparing a first speed of a predefined motion (e.g. punch) obtained based on an integration of the multidimensional acceleration data for the predefined motion without the correction quantity against a second speed of the predefined motion obtained based on reference motion data leading to more accurate speed results than the multidimensional acceleration data measured with the multidimensional accelerometer 302. Thereby, in some embodiments the reference data of the multidimensional object motion may be obtained based on a video or RTLS-based analysis of the predefined motion of a reference object or a reference athlete during an initial training phase 312' of the method 310, which is schematically illustrated in FIG. 3b.

During this initial training step 312' a speed estimate v may be determined based on the multidimensional acceleration data 320 measured with the multidimensional accelerometer 302 attached to the object 304 by a speed determination block 322 on the one hand, while a reference speed value $v_{ref}$ may be determined based on more exact reference motion data 324 of the object's 304 motion by an accurate reference speed determination block 326 on the other hand. Based on both speed values v and $v_{ref}$, the speed correction quantity 314 for a particular motion or punch type may be determined by block 328, for example by determining a difference.

Additionally or alternatively, the at least one speed correction quantity 314 may also be determined based on anatomical quantities of an athlete (e.g. his size), such that reference measurements with a plurality of reference athletes of different anatomy may be performed to obtain anatomy dependent speed correction quantities 314 for different motion or punch types. By comparing reference anatomies with an athlete's anatomy, in particular the arm lengths or the lengths of forearm and upper arm, of a boxer whose punch speed is to be determined by embodiments of the present invention, the speed correction quantity 314 may be accordingly adapted. Hence, the step 312 of determining the at least one correction quantity 314 may further comprise determining a scaling factor 330 based on a relation of an actual anatomical size of the object to an anatomical size of the reference object, e.g. a reference athlete. This scaling factor 330 may then optionally be used by block 328 for determining the speed correction quantity 314.

Alternatively or additionally, three physically distributed three-dimensional acceleration sensors may be installed at the movable object 304, e.g. the athlete's limb or the boxing glove, in order to determine two degrees of rotational freedom (e.g. azimuth and elevation). That is to say, the multidimensional accelerometer 302 attached to the object 304 may comprise three 3-axis-accelerometers spatially distributed at the translatory and/or rotatably movable object 304. In this case, determining the at least one correction quantity 314 may comprise, based on the acceleration data of the three spatially distributed 3-axis-accelerometers, determining the rotation of the object's 304 local coordinate system 306 relative to the global coordinate system 300 during the object's 304 movement in order to computationally compensate for the rotation by a corresponding coordinate transformation of the local coordinate system 306.

Here, an embodiment would be a ring-like arrangement of the three 3-axis-accelerometers around the boxer's wrist or around the boxing glove 304. The farther the sensors or accelerometers are apart from each other, the better will be the outcome for the angular resolution. Hence, in one embodiment the sensors (accelerometers) may be arranged essentially 120° apart from each other around the movable object 304 (Other arrangements also allow the measurements, however, may lead to much more complicated formulas and computations). The different acceleration sensors may be interconnected either by wire or via wireless concepts. Interconnection by wire, however, is expected to be more robust and reliable. In particular in embodiments which apply to boxing also the need for further wireless transceivers and processors is simplifying the approach. Changes of the orientation of the local coordinate system 306, and hence the at least one speed correction quantity 314, may then be obtained by two-fold integration of differences between the relevant acceleration measurements. To be more exact, the rotation of the object's local coordinate system may be determined via two-fold integration of a difference between first acceleration data from a first accelerometer and second acceleration data from a second accelerometer of the three 3-axis-accelerometers.

Figure 4:
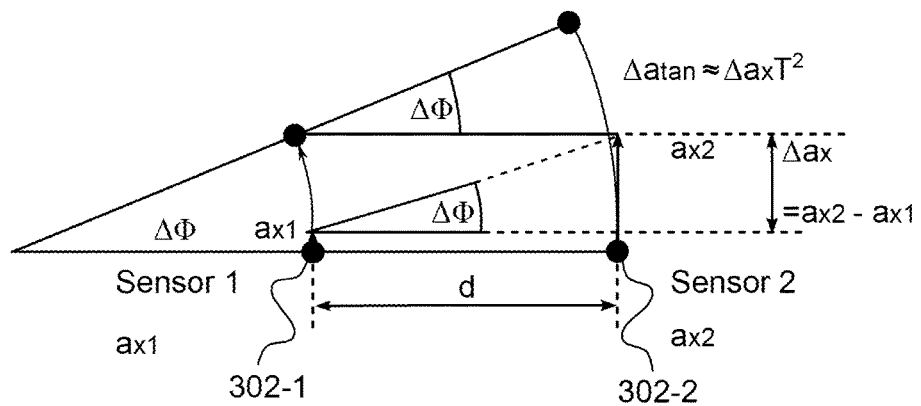
FIG. 4 illustrates a two-dimensional acceleration sensor constellation for determining rotation angles.

An example with two distinct accelerometers 302-1 and 302-2 is depicted in FIG. 4. The difference $\Delta a_x$ for time instant n of the two accelerations $a_{x2}$, $a_{x1}$ leads to a rotation, as the difference or displacement d between the sensors 302-1 and 302-2 has to remain constant. The two-fold derivation of the rotation angle with respect to time may be approximated by $$\ddot{\phi}_n = \frac{\arctan\left(\frac{\Delta a_{x,n} T^2}{d}\right)}{T^2} \approx \frac{\Delta a_x}{d}. \tag{11}$$

Small time intervals may be foreseen with respect to the movement, otherwise a nonnegligible error results for large orientation angle changes. This orientation angle change (deviation) may be obtained by the numerical integration $$\dot{\phi}_n \approx T \sum_{v=n_0}^{n} \frac{\Delta a_{x,v}}{d}, \tag{12}$$

and the resulting orientation angle based on $$\phi_n \approx T^2 \sum_{v=n_0}^{n} \sum_{\mu=n_0}^{v} \frac{\Delta a_{x,\mu}}{d}. \tag{13}$$

Figure 5:
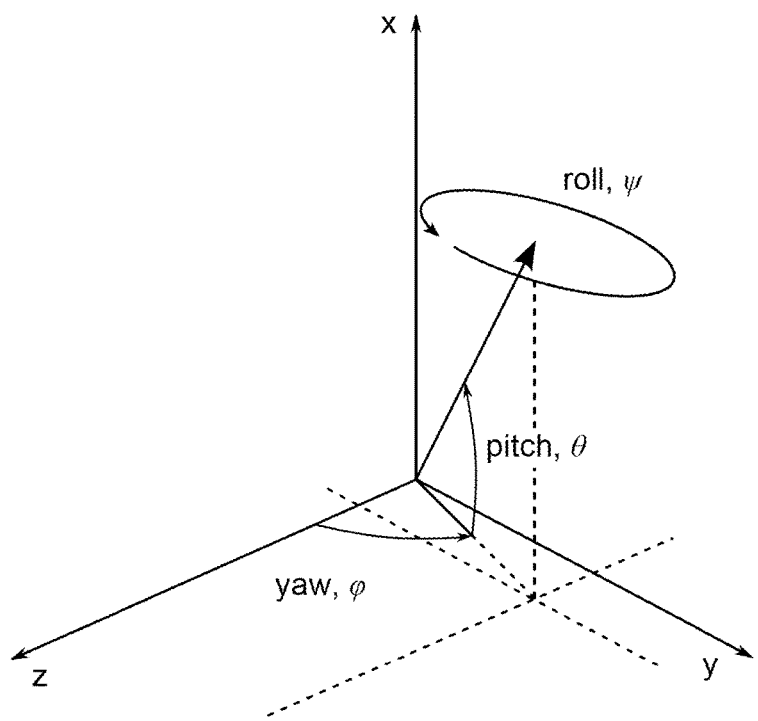
FIG. 5 illustrates orientation angles pursuant to Taite and Bryan.
Figure 6:
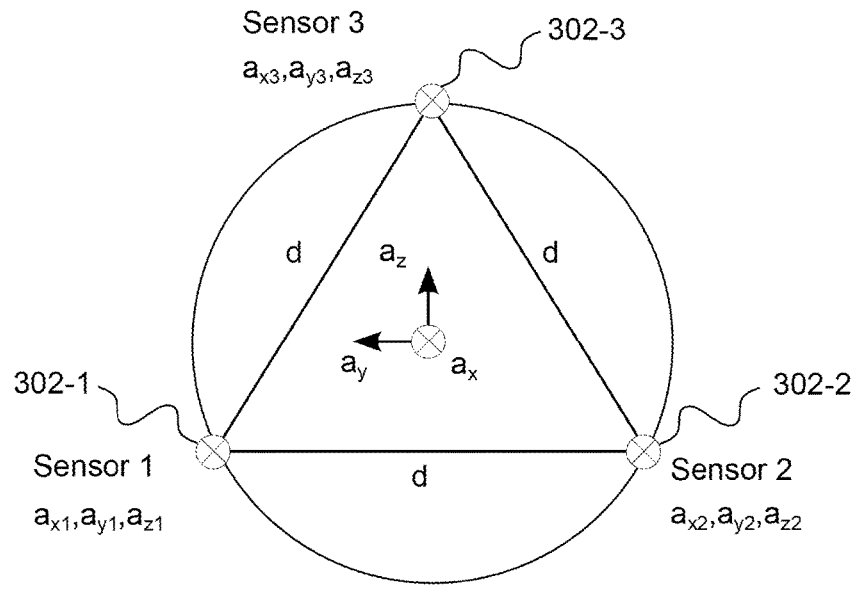
FIG. 6 schematically shows a possible acceleration sensor constellation.

Hence, the rotation of the object's local coordinate system 306 may be determined via two-fold integration of a difference of the acceleration data relevant for the angle of rotation. Similarly, all three angles of rotation (sometimes also referred to as Euler angles) may be determined, which may be used for the coordinate transformation. A second type of conventions is called Tait-Bryan angles, wherein here the three angles are normally called "Heading, Elevation and Bank", or "Yaw, Pitch and Roll" ($\phi$, $\theta$, $\psi$, see FIG. 5). With this convention estimations of the rotation angles may be determined based on the acceleration data. Then, a compensation value may be determined, which will be explained in more detail based on the exemplary sensor constellation of FIG. 6.

Based on the annular configuration of the three sensors 302-1, 302-2, 302-3, the relative heading or yaw may be obtained based on $$\phi_n \approx T^2 \sum_{v=n_0}^{n} \sum_{\mu=n_0}^{v} \frac{a_{x2,\mu} - a_{x1,\mu}}{d}, \tag{14}$$

the elevation or pitch may be determined based on $$\theta_n \approx T^2 \sum_{v=n_0}^{n} \sum_{\mu=n_0}^{v} \frac{a_{x3,\mu} - \frac{a_{x1,\mu} + a_{x2,\mu}}{2}}{\sqrt{\frac{3}{4}} d} \tag{15}$$

wherein $$\frac{a_{x1,\mu} + a_{x2,\mu}}{2}$$

denotes a mean value of the acceleration measurements of sensors 302-1 and 302-2 in x-direction, and $$\sqrt{\frac{3}{4}}d$$

denotes an effective distance of the measurement values. The bank or roll may be obtained based on $$\psi_n \approx T^2 \sum_{v=n_0}^{n} \sum_{\mu=n_0}^{v} \frac{a_{y3,\mu} - \frac{a_{y1,\mu} + a_{y2,\mu}}{2}}{\sqrt{\frac{3}{4}}d} = \quad (16)$$

$$\frac{2T^2}{\sqrt{3}d} \sum_{v=n_0}^{n} \sum_{\mu=n_0}^{v} \left( a_{y3,\mu} - \frac{a_{y1,\mu} + a_{y2,\mu}}{2} \right)$$

Here, not all sensor values have been used. In particular, all $a_{zk,v}$ have not been considered. However, they may be used for improving the estimation of the bank/roll.

Figure 7:
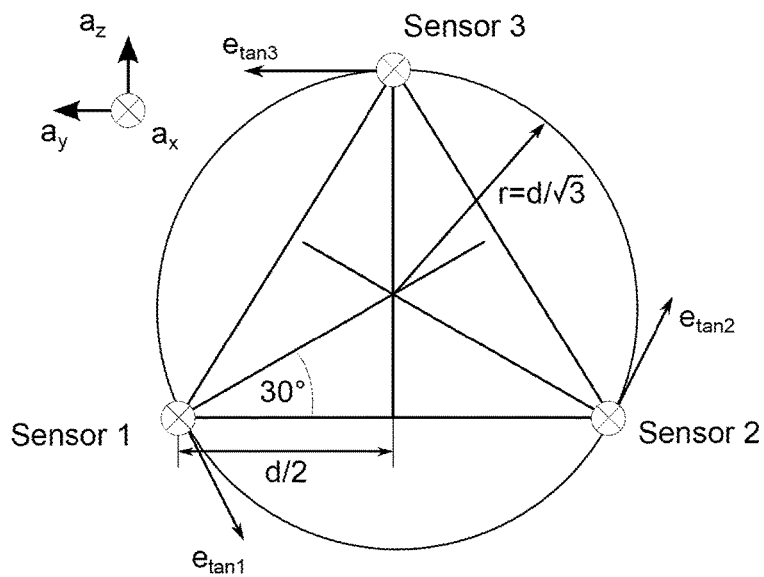
FIG. 7 shows a possible acceleration sensor geometry.

Alternatively, as may be seen from FIG. 7, and $a_{y1/2/3,v}$ and $a_{z1/2/3,v}$ may be used for determining a tangential component according to $$a_{\tan 1,n} = \begin{pmatrix} a_{y1,n} \\ a_{z1,n} \end{pmatrix} e_{\tan 1} = a_{y1,n}[-\cos(\frac{\pi}{3})] + a_{z1,n} + [-\sin(\frac{\pi}{3})] \quad (17)$$

$$a_{\tan 2,n} = \begin{pmatrix} a_{y2,n} \\ a_{z2,n} \end{pmatrix} e_{\tan 2} = a_{y2,n}[-\cos(\frac{\pi}{3})] + a_{z2,n}\sin(\frac{\pi}{3})$$

$$a_{\tan 3,n} = \begin{pmatrix} a_{y3,n} \\ a_{z3,n} \end{pmatrix} e_{\tan 3} = a_{y3,n},$$

with the tangential vectors $$e_{\tan 1} = \left(-\cos(\frac{\pi}{3}), -\sin(\frac{\pi}{3})\right)^T = \left(-0.5, \frac{-\sqrt{3}}{2}\right)^T \quad (18)$$

$$e_{\tan 2} = \left(-\cos(\frac{\pi}{3}), \sin(\frac{\pi}{3})\right)^T = \left(-0.5, \frac{\sqrt{3}}{2}\right)^T \text{ und}$$

$$e_{\tan 3} = (1, 0)^T,$$

which are directed in tangential direction in mathematically positive sense on the surrounding circle. The rotational acceleration may then result from the mean value of said tangential accelerations (wherein the radius of said circle is $r=d/\sqrt{3}$)

$$\ddot{\psi}_n \approx \frac{(a_{\tan 1,n} + a_{\tan 2,n} + a_{\tan 3,n})}{3 \cdot d/\sqrt{3}} = \frac{(a_{\tan 1,n} + a_{\tan 2,n} + a_{\tan 3,n})}{\sqrt{3}d}, \quad (19)$$

allowing computing the roll via two-fold integration according to the above systematics. Note that equal acceleration for all three sensors leads to a rotation of 0° which can be seen from the above equations.

The sensors 302-1, 302-2, and 302-3 do not have to be arranged equidistantly on a circle. However, a differing geometry has to be considered in the above equations. The same holds for the sensor orientation. This orientation may also be calibrated by means of the gravitation at rest or motion inactivity of the system. The sensor axes then should be correspondingly transformed, which may be performed as the rotation compensation.

A minimum required distance between the sensors may be determined based on $$\frac{T^2 \Delta a_{res}}{d} < \Delta \phi. \quad (20)$$

wherein $\Delta a_{res}$ denotes a resolution of the acceleration sensor, e.g. $\Delta a_{res}=2*10^{-3}$ g. In other words if a certain angular resolution is desired, e.g. $\Delta \phi_{res}=1° \approx 0.0175$, then $$d > \frac{T^2 \Delta a_{res}}{\Delta \phi_{res}} = 2.24 \, \mu s, \quad (21)$$

what can quite easily be achieved. An angular resolution of 1° or lower allows some advantageous linearization (e.g. sin x≈x≈tans x). As will be explained below, integration intervals should preferably be short due to sensor drift. Instead of direct estimation based on the above formulas, the calculation may also be used as a basis of a (extended) Kalman-Filter, a Particle-Filter or similar Bayesian-Filters. The angles may be applied directly on the acceleration values, but also on an accumulation of them in order to reduce the computational complexity at the expense of lower accuracy and granularity if the accumulation interval becomes too large. Each angle requires an own rotation matrix, which may be combined to an overall transformation $$R(\phi,\theta,\psi)=A(\phi)B(\theta)C(\psi), \quad (22)$$

such that $$a' = \begin{pmatrix} a'_x \\ a'_y \\ a'_z \end{pmatrix} = R(\phi, \theta, \psi) \begin{pmatrix} a_x \\ a_y \\ a_z \end{pmatrix} = A(\phi)B(\theta)C(\psi) \begin{pmatrix} a_x \\ a_y \\ a_z \end{pmatrix}. \quad (23)$$

With the (Givens-)rotation around the z-axis $$A(\phi) = \begin{pmatrix} \cos(\phi) & -\sin(\phi) & 0 \\ \sin(\phi) & \cos(\phi) & 0 \\ 0 & 0 & 1 \end{pmatrix}, \quad (24)$$

the rotation around the y-axis $$B(\theta) = \begin{pmatrix} \cos(\theta) & 0 & \sin(\theta) \\ 0 & 1 & 0 \\ -\sin(\theta) & 0 & \cos(\theta) \end{pmatrix} \quad (25)$$

and the rotation around the x-axis $$C(\psi) = \begin{pmatrix} 1 & 0 & 0 \\ 0 & \cos(\psi) & -\sin(\psi) \\ 0 & \sin(\psi) & \cos(\psi) \end{pmatrix}. \quad (26)$$

For the inverse rotation the sign of the individual angles may be inverted, being identical to the matrix transposition, i.e., $A(\phi)=A(-\phi)^T$ and $A(\phi)A(\phi)^T=I$. Alternatively, the respective overall transformation matrix may be inverted.

Other calculation embodiments may be based on the original Euler angles, using rotations around two of the three axes. A further embodiment may use quaternions, i.e. number systems that extend the complex numbers. A quaternion may be defined as the quotient of two directed lines in a three-dimensional space or equivalently as the quotient of two vectors. Quaternions can also be represented as the sum of a scalar and a vector.

Calculations for the speed of the object 304 at time instant n may be based on $$v_n = T \sum_{v=n_0}^{n} R_\mu^{-1} \begin{pmatrix} a_{x,v} \\ a_{y,v} \\ a_{z,v} \end{pmatrix} = v_{n-1} + TR_n^{-1} \begin{pmatrix} a_{x,n} \\ a_{y,n} \\ a_{z,n} \end{pmatrix}, \quad (27)$$

wherein the simplified inverse of $R_n = R(\phi_n, \theta_n, \psi_n)$ may be considered as $R_n^{-1} = R(-\phi_n, -\theta_n, -\psi_n)$.

Alternatively or additionally, according to some embodiments, magnetic field sensors placed at the object 304 may be used for orientation measurement, thereby measuring a local, static natural or artificial magnetic field, particularly the angle of inclination and the alterations therein, e.g. (thin-layer) GMR sensors (GMR=Giant MagnetoResistance) or Hall probes. However, the measured local magnetic field may be influenced by (ferro) magnetic materials and building materials and also by electrical currents that flow, which may be highly relevant particularly in interiors. Furthermore, these electrical currents may frequently be highly time-variant and their induced field may be highly variable in space, which can influence or even corrupt a measurement, albeit scarcely such that, by way of example, higher or lower speed measurements may be caused. From the discussion, it is clear that a three-axis magnetic field sensor triple may also be used in order to determine the orientation change completely. That is to say, the movable object 304, e.g. a boxing glove, may further comprise at least one, in particular, three magnetic field sensors, such that the step 312 of determining the at least one speed correction quantity 314 may comprise determining a spatial orientation of the translatory and/or rotatably movable object 304 via measuring a change of a static magnetic field surrounding the object 304 via the magnetic field sensors, wherein the measured change is due to the multidimensional object motion in the static magnetic field. Thereby the static magnetic field may be an artificially generated homogeneous magnetic field, as shown by FIG. 8, or the earth's natural magnetic field.

Figure 8:
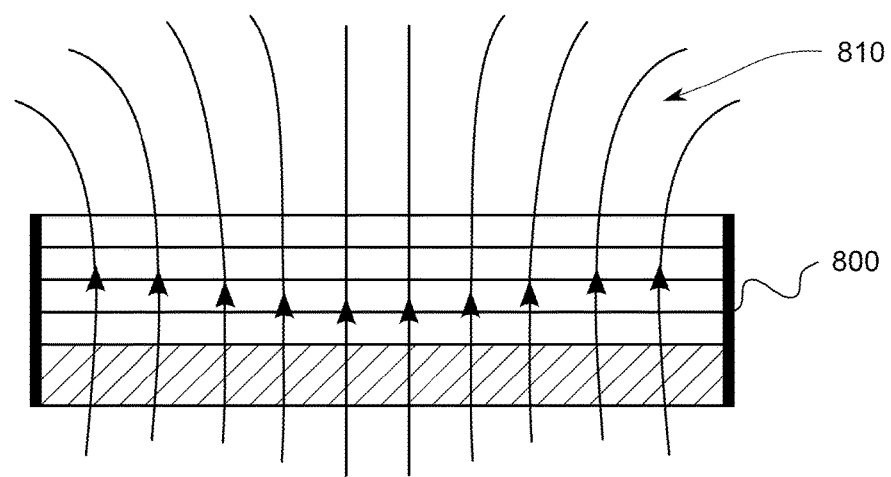
FIG. 8 schematically shows a box ring with an artificially generated magnetic field.

FIG. 8 schematically illustrates a box ring 800 located within an artificially generated homogeneous magnetic field 810. Thereby, the orientation of magnetic field 810 may be essentially orthogonal to the plane defined by the floor of the boxing ring 800. The consideration of a time-variant sensor or accelerometer orientation also has effects on gravitation or gravity as part of the acceleration (see FIG. 1), which also varies in direction over time with respect to the local coordinate system 306. Since acceleration due to gravity, caused by gravitational force, is not part of the real acceleration of the limb 304 imparting a punch, the latter may be subtracted from acceleration due to gravity, in principle, which proves difficult, however, on account of the time-variant direction of the latter in the local coordinate system.

In principle, it would be possible, given constant orientation of an acceleration sensor toward gravitation, to determine acceleration due to gravity by means of long-term averaging, but this cannot be assumed in reality. If it is assumed that a punch event lasts approximately ¼ s, including lunging and stabilization perhaps also ½ s, then in this time only acceleration due to gravity caters for a presumed change of speed of approximately $9.81$ m/s$^2 \cdot 0.25$ s$\approx 2.5$ m/s$\approx 9$ km/h (18 km/h at 0.5 s) away from the earth's surface. This may corrupt the result of the speed estimation and therefore preferably needs to be compensated for as far as possible. In this case, however, the problem is not so much the deduction of gravitation as the actual estimation thereof.

Gravitation therefore brings about a drift in the speed estimated from Eq. (3) by virtue of the continuous integration of the gravitation or in the case of partial compensation for the remainders thereof as in FIG. 9. In this case, acceleration due to gravity is included in the acceleration measured values as bias (see Eq. (4)). However, this bias is not static (constant over time), but rather changes its current orientation over time and hence its split over the direction components as a result of the rotation of the sensors with the first 304. Therefore, gravitation also cannot exclusively be determined as a mean value for the estimated speeds in its split, which means that the effect of acceleration of the first and acceleration due to gravity is barely separable in the global reference system 300 but also in the local reference system 306. In this case, this will be possible only approximately.

Figure 9:
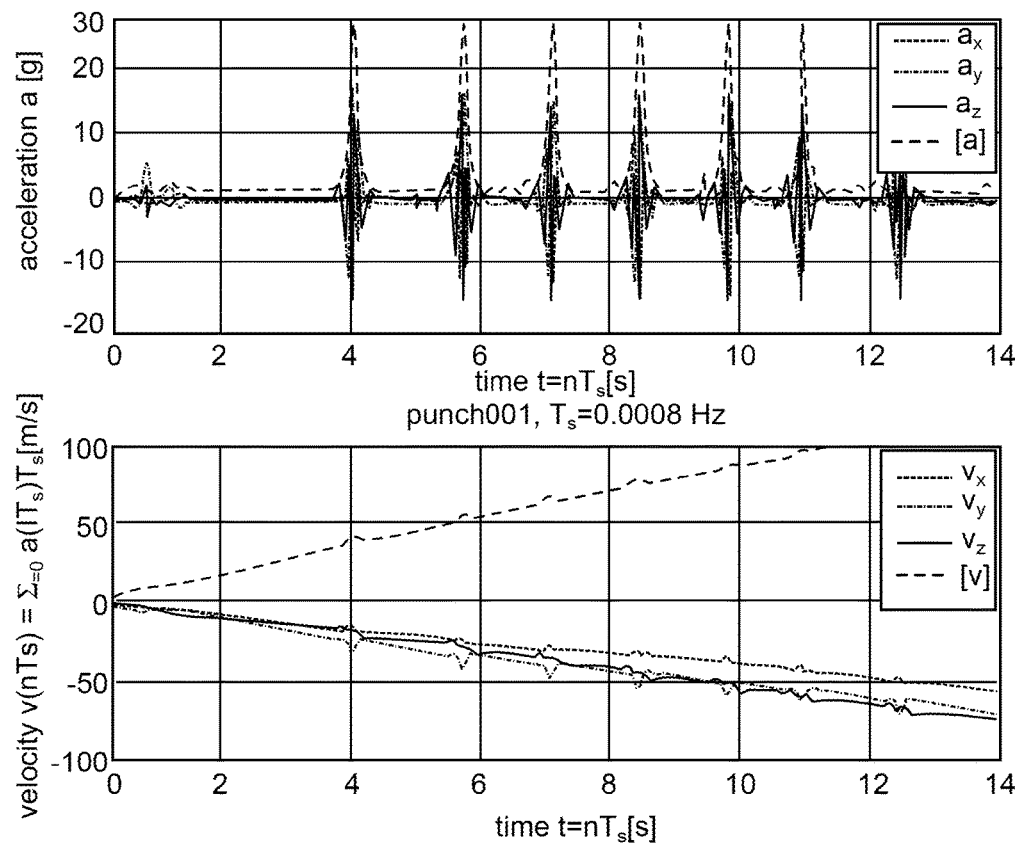
FIG. 9 illustrates an example of a long-term integration of acceleration values during a boxing punch.

The bottom of FIG. 9 clearly shows the drift, firstly in the top figure on account of the fact that all acceleration components $a_x$, $a_y$, and $a_z$ are virtually constantly negative at relative rest or motion inactivity and secondly in the lower figure on account of the continuously increasing speed. The absolute value of the drift also has an almost linear effect, but on consideration of the components it can be seen that firstly the virtually constant component initially has a larger absolute value in the y direction but is later removed from the z component. This indicates a change of position or rotation of the hand imparting the punch in a position of rest between punches, or possibly that the sensor has slipped, perhaps also just the superimposed Random Walk process caused by noise (see page 24).

Consideration of the figures gave rise to an idea for counteracting drift as a result of gravitation in order to determine realistic speeds.

It is possible to determine the long-term gradient (or slope) of the speed curves obtained by integration. From this, it is then possible to use the measurement data from the given section to calculate the gravitation on a section-by-section basis in linearly (or otherwise) interpolated form, i.e., to deduct it from the determined speed. However, only the sensor data for which this otherwise results in a bias in punch direction should actually be used for this. Detection of the rest or motion inactivity phases is again necessary for this.

Another variant may be the regular calibration using the gravitation vector as a short-term mean value from the last established and detected rest phase. This short-term mean value rest phase can be detected from the minimized short-term mean value of the acceleration or from a short-term mean value close to 1 g, which ought to be equivalent.

Fundamentally, the second variant is very similar to the first, with the difference that in the second case the accelerations are already being worked on (in fact this is still equivalent) and that the vector associated with acceleration due to gravity may be predicted while in the first case the speed profile may be interpolated. However, both approaches suffer from the uncertainty as to how the first with the sensor rotates during the punch. When this rotation is estimated the compensation vector of the gravitation can be also rotated accordingly in order to improve the compensation result. According to $\sqrt{x^2+x^2} \approx x$ for $x \gg y$, the impact of the gravitation is greatest if it is in direction of the main acceleration axis, otherwise, if the sensor constellation can arrange this property, the gravity vector may also be neglected without too much harm.

Where estimating the speed using noisy acceleration measured values, the noise in the course of the necessary integration produces what is known as a Random Walk process as follows:

$$\zeta_n = T \cdot \sum_{\nu=n_0}^{n} z_\nu \qquad (28)$$

This is therefore unlimited in the long term in terms of its signal amplitude and also in terms of its power; the power of the process increases linearly with its execution time, i.e. with the integration period $(n-n_0)T$. It can thus be expected, as the calculation of the speed progresses, that the speed estimate quickly "runs away" or drifts away—for an estimation of the distance, this effect is intensified substantially by the dual integration or summation, which is why the latter may virtually never be used in its pure form. This actually does not involve a drift in the acceleration sensor as such, however, because the acceleration data are not being altered continuously in one direction, but rather it involves a random drift due to noisy estimation. The integration can naturally also be considered as an internal function of the speed sensor as a whole.

For an estimation of speed, the occurring drift means that in this case regular calibration may be essential, this being achieved by resetting the speed at a time of relatively static position ($v \approx 0$) or by fixing at another known speed. In return, however, this needs to be detected, which in turn is made difficult by the drift within the process. However, during the fight, no longer-term speeds of uniform direction can be expected, i.e. the absolute value of the average speed vector is limited, which arises fairly quickly from the following consideration:

The average speed or final speed between punches is at least close to zero. Naturally, the summed distance vectors covered, which in this case are the intervals between the starting and end points, are also limited to the maximum distance $S=\sqrt{2}d$ within a boxing ring having a side length d $$|s_n| = \left| \sum_{\nu=n_0}^{n} v_\nu T \right| \qquad (29)$$
$$= \left| \sum_{\nu=n_0}^{n} \sum_{m=n_0}^{\nu} a_m T^2 \right| \leq S$$

As a direct inference, it then follows from this that for $n > n_0$ and long integration times the absolute value of the average speeds $(n-n_0 \to \infty)$ $$|\bar{v}| \leq \frac{S}{(n-n_0)T} \qquad (30)$$

tends towards zero. As a direct consequence, $|v_n| = \sqrt{\bar{v}_m^2 + \bar{v}_m^2 + \bar{v}_m^2}$ then means that this immediately also applies for all components of the average speed $$\bar{v}_{x/y/z n} \leq \frac{S}{(n-n_0)T} \to 0 \text{ für } n \to \infty. \qquad (31)$$

Figure 10:
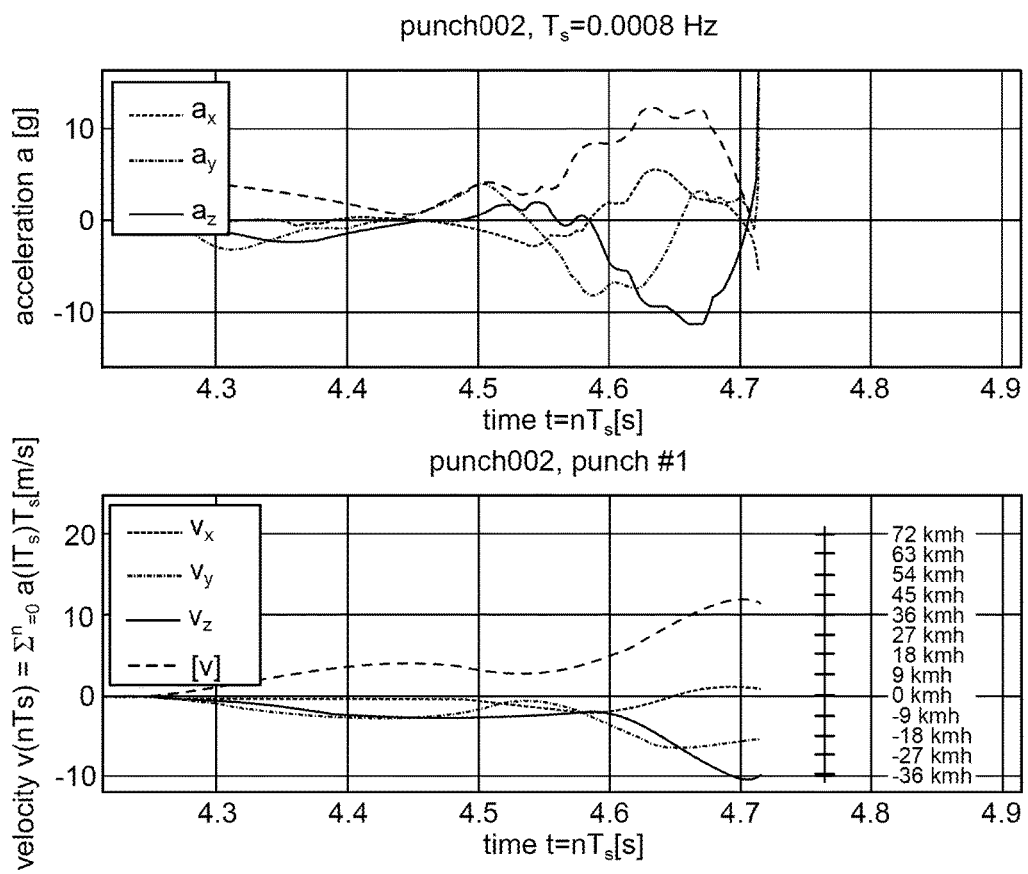
FIG. 10 illustrates an example of a punch pattern with a sampling or measurement rate of 1200 Hz.

However, FIG. 10 clearly shows that the random drift of the Random Walk process takes a significant step back from that as a result of the gravitation, since the noise process has a standard deviation significantly below 1 g. However, this does not mean that this problem would be negligible in the case of longer-term consideration, e.g. over a boxing round or even a bout. However, it can be achieved in this case together with the drift as a result of the gravitation by calibrating or zeroing the speed and simultaneously resetting the lower integration limit.

According to an embodiment, as has been mentioned before, the drift due to gravitation may be compensated by calibrating the multidimensional acceleration data, e.g. on a regular basis. That is to say, the method 310 may comprise calibrating the multidimensional acceleration data from the multidimensional accelerometer 302 by taking into account the acceleration due to gravity. Thereby, for calibrating the last acceleration vector may be used, which may have been recorded during the athlete's last relative recovery phase before a detected punch event. Said last recovery phase acceleration vector may either be determined

- based on a minimization of the absolute value of the short-term mean value of the measured acceleration samples, or
- based on a minimization of the distance between 1 g and the absolute value of the short-term mean value of the measured acceleration samples.

Short term here means a typical interval of relative static behavior of the sensor in the order of tens of milliseconds.

If it is not possible to find a minimum of the absolute value below a predetermined threshold, the last validly determined minimum below said threshold corresponding to a previous punch may be used. The corresponding short-term mean value of the acceleration data may then assumed to be constant and

- may be individually subtracted from the acceleration values corresponding to a detected punch in order to get a compensated speed value or course (an absolute value thereof or distributed in directional components) after the partial integration from the detected beginning of the punch to the corresponding time instant, or
- may be multiplied with the overall duration of the detected punch and subtracted from a maximum speed determined via integration including the gravitation. After a determination of the absolute value thereof the maximum speed without the influence of the gravitation may be obtained.

Hence, calibrating the multidimensional acceleration data may comprise selecting at least one multidimensional acceleration data vector of an inactivity period or recovery phase before a detected motion/punch. Then the speed of the multidimensional object motion may be determined based on the integration of the multidimensional acceleration data taking into account said at least one multidimensional acceleration data vector or an average value thereof.

However, these procedures may only be approximations, as the athlete's hand 304, and hence the direction of the gravity vector, is automatically turning/changing during the punch, leading to a changing distribution of gravity onto the x-, y-, and z-axes of the local coordinate system 306.

The estimated gravitation or the mean value of the estimated gravity vector may then be newly distributed onto the x-, y-, and z-axes of the local coordinate system 306 via a coordinate transformation. This transformed mean value may then be individually subtracted from the acceleration values corresponding to the punch event to obtain speed characteristics via the partial integration from the detected beginning of the punch to the corresponding time instant. The speed value at or shortly before the end of the punch leads to the maximum speed value after determination of the absolute value.

According to embodiments, an exemplary punch profile can be summarized as follows:

Lunge—first phase (up to 0.2 s), in which initially the acceleration moves away from the opponent (in some variants of punch, it may possibly be substantially omitted, e.g. when considering a jab, and in others it may last for longer).

Throw—longest phase (up to 0.3 s), in which there is substantial acceleration towards the opponent. The movement is not purely linear in this case, however. The local system 306 rotates in relation to the initial orientation. The acceleration does not necessarily last until impact, but rather may actually become zero beforehand or even become slightly negative.

Impact—short phase during which initially some of the acceleration sensors may enter saturation or at least reach high peak levels. This does not necessarily apply to all directions of measurement (x, y and z), however, and not necessarily to them totally simultaneously. Some directions of acceleration are inverted several times in their temporal run after the impact, which indicates that oscillation is prompted by the impact. Whether the parts of the sensor, the bard or another part of the measuring device are/is being made to oscillate in this case is difficult to determine and is not of primary interest for the computation, because the oscillation quickly subsides.

Steadying and swinging back—this involves the hand of the fighter swinging back again, any oscillations in the sensor subsiding and the fists (normally) returning to the starting position (into the guard).

The sensor data from further fight situations, such as bobbing and weaving footwork, evasive movements, feinting blows, missed blows past the opponent, combinations of blows and blocking an opponent's blow may also be analyzed. It may also be of interest to obtain further information therefrom, such as—as a simplest example—a step counter.

Calibration for a speed thus may be carried out at regular intervals for three reasons:

on account of the integrated measurement noise (Random Walk),
on account of gravitation (acceleration due to gravity) and
on account of signal saturation at the output of the sensor upon impact by the fist.

In this case, the repetition rate may be significantly higher than once in a round of three minutes, i.e. it may insufficient to calibrate for zero speed between the rounds while the boxer is sitting relatively still in the corners for two minutes. Actually, recalibration may take place after every punch or after every severe jar. The calculation may take place before the impact of a punch during the approximate standstill to be detected. The accurate duration of the punch or the point at which the first is relatively stationary may naturally be dependent on a few factors which may be taken into account for optimum calibration, e.g.

the fighter or the weight class—in lower classes, higher accelerations or speeds than in the heavyweight class are to be expected, even if, in the latter case, the punches are expected to have substantially greater mass and hence force (punch momentum) than in lower classes,
the type of punch—e.g. a hook or a straight-arm punch will have different patterns,
the hand (for right or left deliveries)—the long path when using the hand delivering the punch in comparison with a shorter punch duration when using the jab,
fight tactics—depending on clinch or arm's length,
tiredness of the fighters—at the end of the regular bout length of up to twelve rounds, much slower movements can be expected than at the start.

This large number of parameters for punch duration makes it probably simpler to find such a time directly from the sensor data, for which an option has already been explained before, e.g. the absolute value of the measured acceleration is close to acceleration due to gravity ($|\hat{a}| \approx 1$ g).

From the point of view of the recorded measurement curves, punch detection can take place in different ways, e.g. at the level of the measured total acceleration or using the saturation which occurs and steadying of the measured values after impact if the total range of the sensor is insufficient: usual integrated, commercial acceleration sensors range up to 16 or 24 g. The saturation used for detection should then occur generally in real time for multiple axes of the sensor and have a certain duration in order to absorb other acceleration peaks, e.g. during acceleration. Furthermore, the steadying behavior of the sensor values means that the sensor should not have entered saturation for a while beforehand. This time frame should be fixed in an appropriately meaningful fashion on the basis of empirical values.

If the punch is more likely to need to be detected by means of the steadying process, rapid changes in the acceleration direction in a short time interval may also be an additional metric of interest. Severe accelerations occur not only in the main punch direction but also on the other axes.

A further embodiment may detect the punch during the acceleration phase by checking whether one or more acceleration components $a_x$, $a_y$ and $a_z$ are above an acceleration threshold—e.g. 12 g—for a predetermined time duration—e.g., greater than 20 ms as a time threshold. In this case, the use of the predetermined time duration eliminates brief accelerations, while the acceleration threshold allows relatively slow movements or movements with little springiness to be ignored. An advantage of this approach is that it is also possible to detect punches which pass the opponent and the opponent's guard even though the peak acceleration will be below a threshold.

It is also possible to contemplate combinations of the above embodiments in order to improve the detection result, i.e. to increase the probability of detection and to minimize the probability of miss detection. To this end, it should then also be checked whether an acceleration phase has taken place before impact in the first place. Otherwise, it is more likely that a punch from the opponent into one's own guard will be involved.

Detection of the punch using impact may, in a simplified approach, be the first step in speed calculation in order to permit real-time calibration for zero speed and also for acceleration due to gravity, said calibration then taking place backwards from this time. For the purpose of distinction, particularly sequences of blows, blows past the target or into (one's own) guard, footwork and fast evasive movements need to be examined. There are no measurement data available from direct fight situations to date.

An algorithm proposal is presented below by way of example. This, first of all, involves a discussion of a plurality of possible variants:

Impact detection
    Signal in saturation (or above threshold) on a sensor
    Signal in saturation (or above threshold) on other sensor in temporal proximity
    Signal not in saturation L samples beforehand Search for the start of a motion/punch
    Backward search up to (mean) absolute value of the acceleration (over K values) close to 1 g and
    Minimum blow time exceeded
    Maximum search time not reached
    Then check the motion/punch (relatively long time, strong acceleration)

Calibration for zero speed
    Determination of the vector for acceleration due to gravity by average over M values
    Deduction of the vector associated with acceleration due to gravity for integration values or deduction from the end result following multiplication by blow duration Calculation of the maximum speed
    Integration or summation (eventually including directional estimation and compensation)
    Backward search for the local maximum (until speed lower than predecessor)

That is to say, method 310 may comprise detecting the motion of the object 304, in particular a punch, based on, using the multidimensional acceleration data from the multidimensional accelerometer 302, detecting an excess of an acceleration threshold and/or detecting a saturation of one or more dimensions of the multidimensional acceleration data and/or detecting an oscillation of the acceleration data. Thereby, detecting the multidimensional object motion may be based on detecting an excess of an acceleration threshold for a predefined amount of time, e.g. 50 ms. Detecting the multidimensional object motion may also comprise determining an end of the motion, e.g. a punch, by detecting a point of saturation of one or more dimensions of the multidimensional acceleration data under the premise that the acceleration data has not been in saturation or above a threshold for a predetermined time before said point of saturation. A beginning of said motion (e.g. punch) may be determined by performing a reverse search from the point of saturation until a minimum average value of acceleration is detected in the multidimensional acceleration data received from the multidimensional accelerometer 302.

Figure 11:
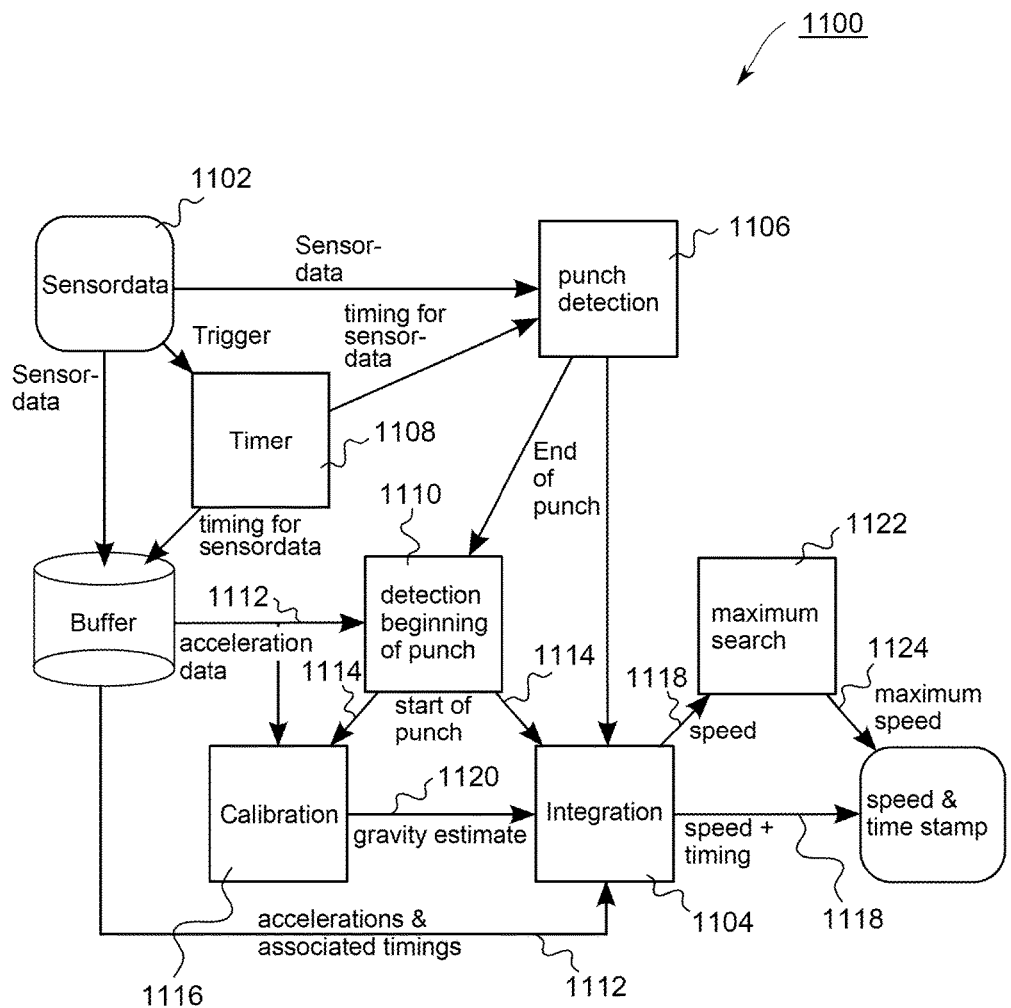
FIG. 11 schematically shows a block diagram of an apparatus according to an embodiment.
Figure 12A:
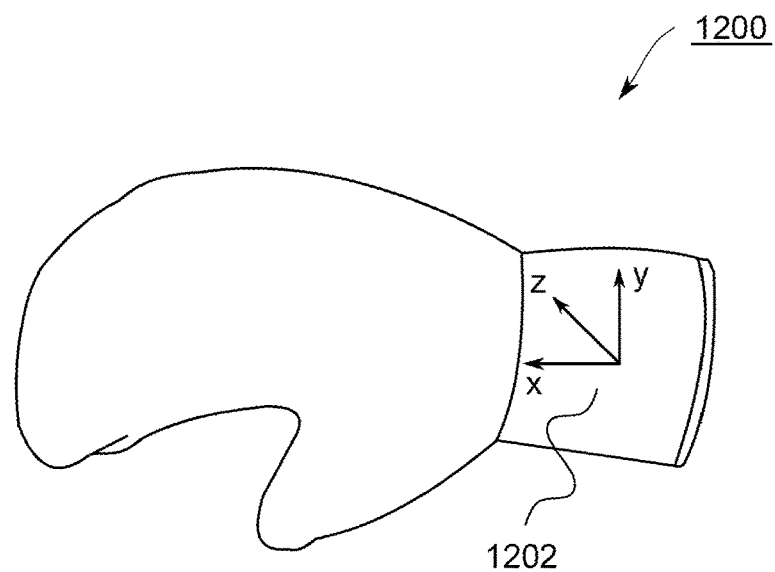
FIG. 12a shows a boxing glove with local coordinate system and at least one acceleration sensor.
Figure 12B:
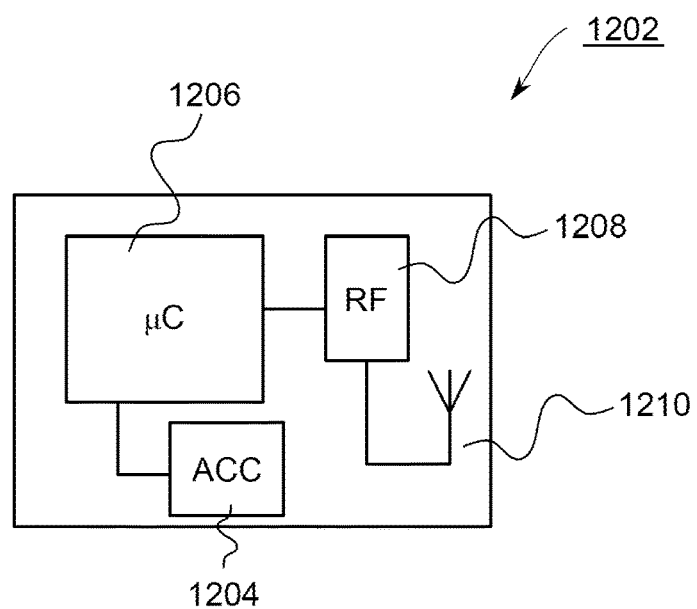
FIG. 12b illustrates a block diagram of at least one acceleration sensor coupled to an apparatus according to an embodiment, both integrated in a boxing glove.

FIG. 11 illustrates an embodiment of an apparatus 1100 for determining at least the speed of a multidimensional object motion in a global coordinate system based on multidimensional acceleration data 1102 from a multidimensional accelerometer placed at a translatory and/or rotatably movable object, such as a boxing glove, for example. A boxing glove 1200 comprising a multidimensional accelerometer 1202 for a local coordinate system of the boxing glove 1200 is schematically illustrated in FIG. 12a. The accelerometer 1202, as shown in FIG. 12b, may comprise an acceleration sensor 1204 coupled to a microcontroller 1206 which may implement or house a local embodiment of the apparatus 1100 in some embodiments. The microcontroller 1206 may be coupled to a radio front end 1208 for transmitting the measured acceleration and/or speed data via an antenna 1210 to a remote unit, such as a central unit housing an embodiment of the apparatus 1100 or a display device, for example.

Turning back to FIG. 11, the apparatus 1100 comprises a processor 1104 which is operable to determine, based on the multidimensional acceleration data 1102, at least one correction quantity taking into account a rotation of the object's local coordinate system relative to the global coordinate system during the multidimensional object motion. Further, the processor 1104 or another part thereof is operable to determine the speed 1118 of the multidimensional object motion based on an integration of the multidimensional acceleration data and in consideration of the at least one correction quantity. As has been explained before, the correction quantity may be a scaling factor and/or may be based on differences of the relevant acceleration data, for example.

The apparatus 1110 may also be adapted to perform punch detection by processing block 1106. Thereby, a punch may be detected based on, using the multidimensional acceleration data 1102, detecting an excess of an acceleration threshold and/or detecting a saturation of one or more dimensions of the multidimensional acceleration data and/or detecting an oscillation of the acceleration data. For that purpose timing data related to the he multidimensional acceleration data 1102 may be provided to the punch detector 1106 by a clock or timing provision entity 1108. The resulting time corresponding to the end of the motion/punch may then be used for detecting the start of said punch in block 1110. This may be done by a backward search in buffered acceleration data 1112 as explained above. The detected punch start time 1114 as well as the buffered acceleration data 1112 may be used for gravity calibration in block 1116 according to the explained principles above. Together with the buffered acceleration data 1112 the resulting gravity estimate 1120 may then also be used for correct speed estimation by processor 1104. Having determined a speed course 1118 for the detected punch, said speed course 1118 may be used to determine the maximum punch speed 1124 by processing block 1122.

By means of the apparatuses and methods described herein for automated detection of punches, punch types, movements, evasive movements, etc., statistical data on the sport event or an athlete may be generated, thereby allowing a comparison of the behavior of an athlete in different sport events, different behaviors of the same athlete during a sport event, the behaviors of different athletes, etc. For that purpose the multidimensional acceleration data and/or the determined speed may be stored in a database and the stored data may be post processed for motion analysis in some embodiments. In other embodiments the purpose the multidimensional acceleration data and/or the determined speed may be determined in real-time. Thereby, real-time determination guarantees responses or results within strict time constraints. In embodiments real-time response times may be understood to be in the order of milliseconds and sometimes microseconds. Additionally or alternatively, information indicative of the determined multidimensional acceleration data and/or speed may be displayed at a remote display and/or a display at the object, e.g. the athlete or the boxing glove, itself.

According to some embodiments the estimated or determined speed may be indicated in real-time by corresponding colors at the athlete's sport equipment, for example, the boxing glove or his shorts. That is to say, a first speed may be indicated by a first color (e.g. red for high speed) whereas a second speed may be indicated by a second color (e.g. blue for low speed) of an appropriate illuminant (values in between may be indicated by a mixture of the two colors). In one embodiment the illuminant may be realized by smart textiles, e.g. of the boxing glove, comprising color changing garments, for example. Smart textiles are fabrics that enable computing, digital components, and electronics to be embedded in them. Thereby, smart or electronic textiles may be divided into two main categories, i.e., E-textiles with classical electronic devices such as conducting wires, integrated circuits, Light-Emitting-Diodes (LEDs), and conventional batteries embedded into garments. This is the common type of e-textile. Also, there are E-textiles with modern electronics directly on the textile fibers. This can include either passive electronics such as pure wires, conducting textile fibers or more advanced electronics such as transistors, diodes, and solar cells. Of course, the speed displaying techniques, such as a numerical display of the speed the glove, at the glove's surface are also conceivable. In such embodiments the related signal processing and, hence, also the speed estimation may directly take place in corresponding processing circuitry installed in or at the boxing glove. Additionally, it should be assured that the introduced materials do not pose an extra threat to the health of boxer wearing the glove or his opponent.

Further embodiments allow inserting a display indicative of the estimated speed in recorded or live motion data, such as in recoded or live television events. Here, also central speed estimation, at a central processor remote from the boxing glove, is possible.

With embodiments a spectator of a sport event can develop a feeling for the existing speeds and potential hits. The same holds for the athlete himself and/or his coach during a fight or training. The display of the speed by color codes or similar techniques enables an instant feedback and the possibility to adapt a fighting or training strategy. If the estimated speed or the corresponding display indicates that punches are getting slower, this may be an indication that the athlete gets tired. In this case adequate countermeasures may be taken.

Also, further statistical characteristics may be detected by embodiments of methods and apparatuses, such a punching-frequency, information on footwork and/or passiveness, or energy consumption of the athlete. Acoustic signalization may also be feasible for training purposes.

According to embodiments determining the speed may be complemented by the determination of further related statistical quantities during or after the fight, such as, for example:
  speed and/or type of punch versus time or in a histogram representation,
  the amount and distribution of punches (per fist);
  the punch frequency,
  the amount or number of taken hits,
  the athlete's generated mechanical power.
  the athlete's activity,
  footwork,
  etc.

As has been mentioned before the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functions of various elements shown in the figures, including any functional blocks, may be provided through the use of dedicated hardware, such as "a processor", "a controller", etc., as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

The invention claimed is:
1. A method for determining a speed of a multidimensional motion of an athlete in a global coordinate system based on multidimensional acceleration data from a multidimensional accelerometer placed at a movable limb of the athlete, the movable limb being at least one of translatory and rotatable, and the movable limb defining a local coordinate system, the method comprising:

determining, based on the multidimensional acceleration data, at least one correction quantity taking into account a rotation of the local coordinate system relative to the global coordinate system during the multidimensional motion; and determining the speed of the multidimensional motion based on an integration of the multidimensional acceleration data and in consideration of the at least one correction quantity; and detecting at least one of the multidimensional motion and a period of motion inactivity based on at least one of (i) detecting an excess of an acceleration threshold using the multidimensional acceleration data, (ii) detecting a saturation of one or more dimensions of the multidimensional acceleration data, and (iii) detecting an oscillation of the multidimensional acceleration data.

2. The method according to claim 1, wherein
the athlete is a boxer wearing at least one boxing glove,
the multidimensional motion is a multidimensional punch of the boxer, and
the multidimensional accelerometer is placed at the at least one boxing glove.

3. The method according to claim 1, wherein the determining the at least one correction quantity comprises:

comparing a first speed of an athlete's motion against a second speed of the athlete's motion, the first speed of the athlete's motion being obtained based on an integration of the multidimensional acceleration data for the athlete's motion without the at least one correction quantity, and the second speed of the athlete's motion obtained based on reference motion data leading to more accurate speed results than the multidimensional acceleration data; and determining a scalar correction quantity based on the comparison.

4. The method according to claim 3, wherein the reference motion data is obtained based on a video or real-time locating system based analysis of motion of a reference athlete during an initial training phase of the method.

5. The method according to claim 4, wherein the determining the at least one correction quantity further comprises:

determining a scaling factor based on a relation of an actual anatomical size of the athlete to an anatomical size of the reference athlete.

6. The method according to claim 1, wherein
the multidimensional accelerometer comprises three 3-axis-accelerometers spatially distributed at the movable limb; and
the determining the at least one correction quantity includes
determining, based on the multidimensional acceleration data of the three 3 axis-accelerometers, the rotation of the local coordinate system relative to the global coordinate system during movement of the athlete in order to computationally compensate for the rotation by a corresponding coordinate transformation of the local coordinate system.

7. The method according to claim 6, wherein the rotation of the local coordinate system is determined via two-fold integration of a difference between first acceleration data from a first accelerometer and second acceleration data from a second accelerometer of the three 3-axis-accelerometers.

8. The method according to c claim 1, wherein
the athlete further includes at least one magnetic field sensor; and
the determining the at least one correction quantity includes
determining a spatial orientation of the movable limb via measuring a change of a static magnetic field surrounding the movable limb via the at least one magnetic field sensor; and
the change is due to the multidimensional motion in the static magnetic field.

9. The method according to claim 8, wherein the static magnetic field is an artificially generated homogeneous magnetic field.

10. The method according to claim 1, wherein the determining the at least one correction quantity comprises:
estimating the rotation of the local coordinate system based on the multidimensional acceleration data.

11. The method according to claim 1, further comprising:
calibrating the multidimensional acceleration data by taking into account acceleration due to gravity.

12. The method according to claim 11, wherein the calibrating the multidimensional acceleration data comprises:

selecting at least one multidimensional acceleration data vector for a period of motion inactivity before a detected motion of the athlete; and determining the speed of the multidimensional motion based on the integration of the multidimensional acceleration data taking into account said at least one multidimensional acceleration data vector or an average value thereof.

13. The method according to claim 1, wherein the detecting at least one of the multidimensional motion and a period of motion inactivity is based on the detecting the excess of the acceleration threshold for an amount of time.

14. The method according to claim 1, wherein the detecting at least one of the multidimensional motion and a period of motion inactivity comprises:

determining an end of the multidimensional motion by detecting a point of saturation of the one or more dimensions of the multidimensional acceleration data under the premise that the multidimensional acceleration data has not been in saturation or above a threshold for a first time interval before said point of saturation; and determining a beginning of said multidimensional motion by performing a reverse search from the point of saturation until a minimum average value of acceleration is detected in the multidimensional acceleration data.

15. The method according to claim 1, further comprising:
storing at least one of the multidimensional acceleration data and the determined speed; and
post processing the stored at least one of the multidimensional acceleration data and the determined speed for motion analysis.

16. The method according to claim 1, further comprising:
displaying information indicative of the determined speed.

17. A computer program product including a non-transitory computer readable medium having computer readable program code embodied therein, wherein the computer readable program code, when loaded on a computer, a processor, or a programmable hardware component, causes the computer, processor or programmable hardware component to implement a method for determining a speed of a multidimensional motion of an athlete in a global coordinate system based on multidimensional acceleration data from a multidimensional accelerometer placed at a movable limb of the athlete, the movable limb being at least one of translatory and rotatable, and the movable limb defining a local coordinate system, the method comprising:

determining, based on the multidimensional acceleration data, at least one correction quantity taking into account a rotation of the local coordinate system relative to the global coordinate system during the multidimensional motion;

determining the speed of the multidimensional motion based on an integration of the multidimensional acceleration data and in consideration of the at least one correction quantity; and detecting at least one of the multidimensional motion and a period of motion inactivity based on at least one of (i) detecting an excess of an acceleration threshold using the multidimensional acceleration data, (ii) detecting a saturation of one or more dimensions of the multidimensional acceleration data, and (iii) detecting an oscillation of the multidimensional acceleration data.

18. An apparatus for determining a speed of a multidimensional motion of an athlete in a global coordinate system based on multidimensional acceleration data from a multidimensional accelerometer placed at a movable limb of the athlete, the movable limb being at least one of translatory and rotatable, and the movable limb defining a local coordinate system, the apparatus comprising:

a processor operable to
determine, based on the multidimensional acceleration data, at least one correction quantity taking into account a rotation of the local coordinate system relative to the global coordinate system during the multidimensional motion, determine a speed of the multidimensional motion based on an integration of the multidimensional acceleration data and in consideration of the at least one correction quantity, and detect at least one of the multidimensional motion and a period of motion inactivity based on at least one of (i) an excess of an acceleration threshold detected using the multidimensional acceleration data, (ii) a saturation of one or more dimensions of the multidimensional acceleration data, and (iii) an oscillation of the multidimensional acceleration data.

19. The apparatus according to claim 18, wherein
the athlete is a boxer wearing at least one boxing glove,
the multidimensional motion is a multidimensional punch of the boxer, and
the multidimensional accelerometer and the apparatus are placed at the at least one boxing glove.

20. The method of claim 1, wherein the detecting at least one of the multidimensional motion and a period of motion inactivity comprises:

detecting a movement of the movable limb based on at least one of the excess of an acceleration threshold, the saturation of one or more dimensions of the multidimensional acceleration data, and the oscillation of the acceleration data.

* * * * *